(12) United States Patent
Peterson et al.

(10) Patent No.: US 9,015,208 B2
(45) Date of Patent: Apr. 21, 2015

(54) MAPPING DATA ELEMENTS IN A USER INTERFACE

(71) Applicant: International Business Machines Corporation, Armonk, NY (US)

(72) Inventors: Trenten Peterson, Florence, TX (US); Daina E. Pupons-Wickham, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/054,942

(22) Filed: Oct. 16, 2013

(65) Prior Publication Data
US 2014/0122539 A1    May 1, 2014

Related U.S. Application Data

(63) Continuation of application No. 13/663,909, filed on Oct. 30, 2012.

(51) Int. Cl.
*G06F 17/30* (2006.01)
*G06F 3/0484* (2013.01)

(52) U.S. Cl.
CPC .... *G06F 17/30297* (2013.01); *G06F 17/30345* (2013.01); *G06F 3/0484* (2013.01)

(58) Field of Classification Search
CPC .. G06F 17/286; G06F 17/30554; G06Q 10/10
USPC .................................. 715/748; 707/702, 805
See application file for complete search history.

(56) References Cited

U.S. PATENT DOCUMENTS

| | | | |
|---|---|---|---|
| 5,553,218 A | 9/1996 | Li et al. | |
| 5,945,990 A * | 8/1999 | Morrison et al. | 715/748 |
| 6,763,358 B2 * | 7/2004 | Anderson et al. | 707/702 |
| 7,010,546 B1 | 3/2006 | Kolawa | |
| 7,403,890 B2 * | 7/2008 | Roushar | 704/9 |

(Continued)

OTHER PUBLICATIONS

"U.S. Appl. No. 13/663,909 Office Action", Mar. 10, 2014, 12 pages.

(Continued)

*Primary Examiner* — Mariela Reyes
*Assistant Examiner* — Thong Vu
(74) *Attorney, Agent, or Firm* — DeLizio Gilliam, PLLC

(57) ABSTRACT

A user interface can be used to associate data in a database. Data is presented in an assignment column, a first data element column, and a second data element column in the user interface, wherein the first and second data element columns show data elements stored in a database. First user input is received to select one or more data elements in the first data column. After receiving the first user input, the data assignment elements of the data assignment column are configured to correspond to the data elements of the second column Second user input is received in one or more of the data assignment elements indicating selection of one or more data elements of the second data column. The selected one or more data elements in the first data column are associated in the database with the selected one or more data elements in the second data column.

8 Claims, 11 Drawing Sheets

(56) References Cited

U.S. PATENT DOCUMENTS

| | | |
|---|---|---|
| 7,421,663 B2 | 9/2008 | Homes et al. |
| 8,161,081 B2 | 4/2012 | Kaufman et al. |
| 8,548,992 B2 | 10/2013 | Abramoff et al. |
| 2005/0257193 A1 | 11/2005 | Falk et al. |
| 2008/0215588 A1 | 9/2008 | Mattheisen |
| 2010/0138790 A1 | 6/2010 | Rashkovskiy |

OTHER PUBLICATIONS

"U.S. Appl. No. 13/663,909 Final Office Action", May 19, 2014, 15 Pages.

DVK, , "GUI Patterns to Edit Data with Many-To-Many Relationship", stackoverflow.com Obtained from Internet: http://stackoverflow.com/questions/1600801/gui-patterns-to-edit-data-with-many-to-many-relationship Oct. 2009 , 3 pages.

* cited by examiner

FIG. 1

| PERSONNEL | |
|---|---|
| NAME | ▲ |
| GEORGE | |
| LENNIE | |
| MATT | |
| DRUDGE | |
| SHAWN | |
| GUSS | |
| CARLTON | |
| JENNY | |
| HARRY | |
| TINA | |
| DAINA | |
| DEVELOPER1 | |

| ASSIGNMENT ▲ |
|---|
| ☐ |
| ☐ |
| ☐ |
| ☐ |
| ☐ |
| ☐ |
| ☐ |
| ☐ |
| ☐ |
| ☐ |
| ☐ |
| ☐ |

| ROLES | |
|---|---|
| NAME | ▲ |
| SUPER USER | |
| APPLICATION ADMINISTRATOR | |
| SYSTEM ADMINISTRATOR | |
| ROLE ONE | |
| ROLE TWO | |
| ROLE THREE | |
| ROLE FOUR | |

FIG. 6

| PERSONNEL | |
|---|---|
| NAME ▲ | |
| GEORGE | 606 |
| LENNIE | 608 |
| MATT | 610 |
| DRUDGE | 612 |
| SHAWN | 614 |
| GUSS | 616 |
| CARLTON | 618 |
| JENNY | 620 |
| HARRY | 622 |
| TINA | 624 |
| DAINA | 626 |
| DEVELOPER1 | 628 |

602

630

| ASSIGNMENT ▲ |
|---|
| ☐ 632 |
| ☐ 634 |
| ☐ 636 |
| ☐ 638 |
| ☐ 640 |
| ☐ 642 |
| ☐ 644 |
| ☐ 646 |
| ☐ 648 |
| ☐ 650 |
| ☐ 652 |
| ☐ 654 |

| ROLES | |
|---|---|
| NAME ▲ | |
| SUPER USER | 664 |
| APPLICATION ADMINISTRATOR | 666 |
| SYSTEM ADMINISTRATOR | 668 |
| ROLE ONE | 670 |
| ROLE TWO | 672 |
| ROLE THREE | 674 |
| ROLE FOUR | 676 |

660

601

| ASSIGNMENT ▲ |
|---|
| ☐ 603 |
| ☐ 605 |
| ☐ 607 |
| ☐ 609 |
| ☐ 611 |
| ☐ 613 |
| ☐ 615 |
| ☐ 617 |
| ☐ 619 |
| ☐ 621 |
| ☐ 623 |
| ☐ 625 |

| GROUPS |
|---|
| NAME ▲ |
| ADMINS 684 |
| ORDER ENTRY 686 |
| SALES MANAGERS 688 |
| SALES ASSOCIATES 690 |
| USERS 692 |

680

MAPPING DATA ELEMENTS IN A USER INTERFACE

RELATED APPLICATIONS

This application is a Continuation of and claims the priority benefit of U.S. application Ser. No. 13/663,909 filed Oct. 30, 2012.

BACKGROUND

Embodiments of the inventive subject matter generally relate to the field of computers, and, more particularly, to efficiently mapping many-many relationships between user interface elements.

In information management software applications, one or more objects, options, etc. may be related with one or more other objects, options, etc. For example, in database management systems, users may need to assign one or more data elements in a first column to one or more data elements in a second column. Similarly, users may need to assign one or more data elements in the first column to one or more data elements in a second column, and in turn to one or more data elements in the third column, etc. Users may also need to assign one or more data elements in a reverse direction (e.g., from the second column to the first column, etc.). When presenting such relationships between data elements, information management systems may employ various user interfaces, such as list interfaces, table interfaces, line map interfaces, etc. However, such user interfaces may not be very efficient. For example, in a list user interface, a user can select a single item at a time (e.g., by opening a separate dialog box representing the properties of the selected item). The properties of the selected item may indicate its relationship to an item(s) in another list. However, list user interfaces may not efficiently display many-to-many relationships (among multiple items in different lists). Additionally, list interfaces may not allow bi-directional assignments (i.e., assignment in either direction) between data elements of two or more columns. Furthermore, list interfaces may not allow users to easily compare related data elements in two or more columns.

As for table user interfaces, tables present data elements in rows and columns. In tables, users can typically associate data elements in two sets of data elements by marking intersections of rows and columns (e.g., making a check mark with a mouse click). In some instances, table user interfaces clearly show associations between data elements by showing check marks in the table. However, table interfaces support data associations between only two sets of data elements, and in some instances, table interfaces may not clearly show data associations. For example, users may have difficulties identifying data associations between data elements that do not occupy consecutive rows. Also, in the table user interface, when the set of data elements does not fit entirely on a user's screen, the user may scroll to view data elements that are not visible. Scrolling can be tedious, especially when the number of data elements is large.

As noted above, some data presentation interfaces do not facilitate easy and efficient data viewing and processing for many to many associations between sets of data elements. Some embodiments of the inventive subject matter provide better ways of viewing and processing data.

SUMMARY

Embodiments of the inventive subject matter include a method to use a graphical user interface to associate data in a database. The method presents a data assignment column, a first data element column, and a second data element column in the graphical user interface, wherein the first and second data element columns show data elements stored in a database. The method receives first user input selecting one or more data elements in the first data column. The method, after receiving the first user input, configures data assignment elements of the data assignment column to correspond to the data elements of the second column. The method moves the data assignment column in juxtaposition to the second data element column, wherein the data assignment column's data assignment elements visually correspond to the second data column's data elements. The method receives second user input in one or more of the data assignment elements indicating selection of one or more data elements of the second data column. The method associates, in the database, the selected one or more data elements in the first data column with the selected one or more data elements in the second data column.

BRIEF DESCRIPTION OF THE DRAWINGS

The present embodiments may be better understood, and numerous objects, features, and advantages made apparent to those skilled in the art by referencing the accompanying drawings.

FIG. 1 depicts an example diagram of graphical elements used by a data association interface.

FIG. 6 depicts an example diagram of graphical elements used by a data association interface for association between data elements residing in three columns.

DESCRIPTION OF EMBODIMENT(S)

Figure 2:
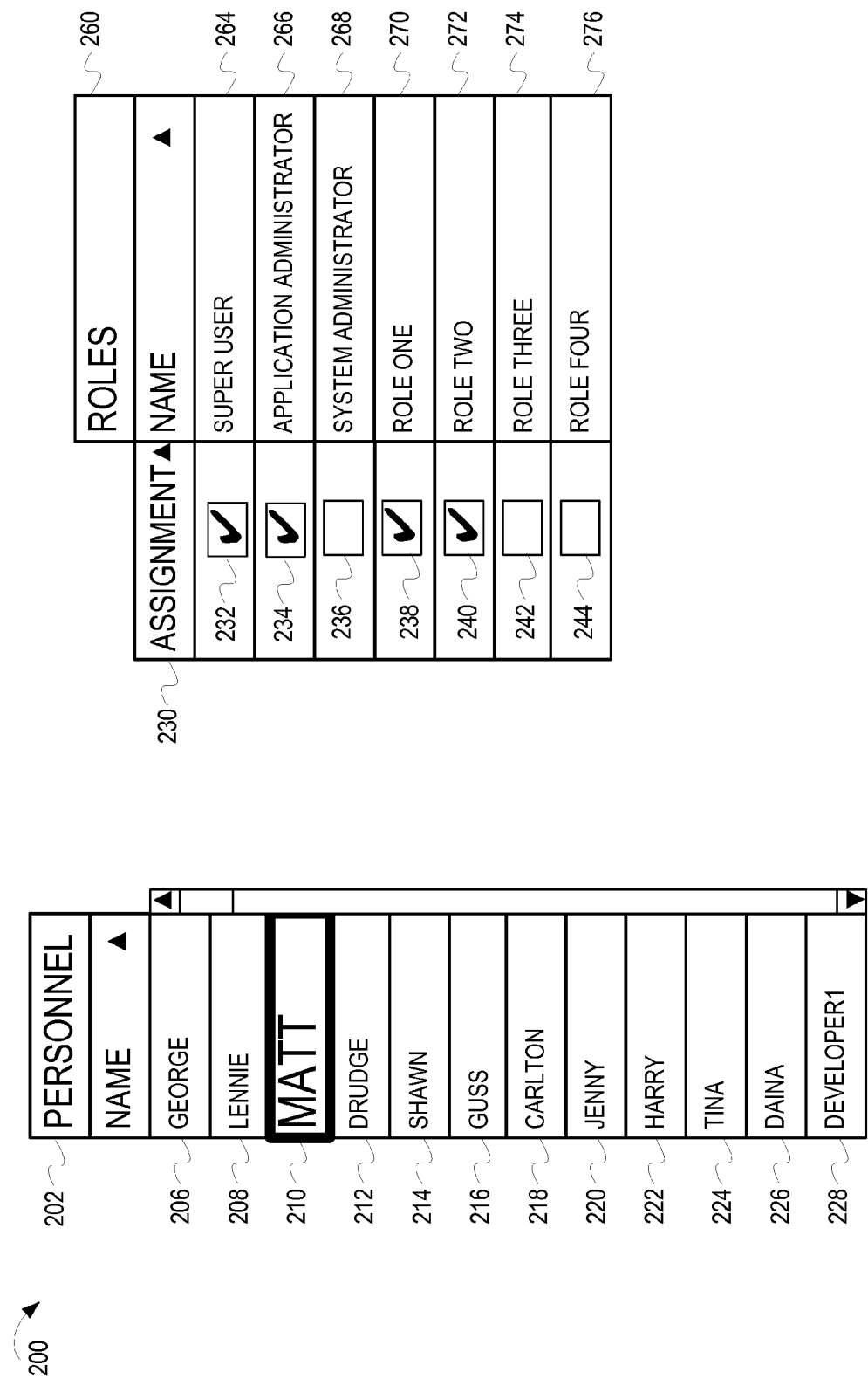
FIG. 2 depicts an example diagram of a data association interface that facilitates a one-to-many assignment between data elements residing in two columns.

The description that follows includes exemplary systems, methods, techniques, instruction sequences and computer program products that embody techniques of the present inventive subject matter. However, it is understood that the described embodiments may be practiced without these specific details. For instance, examples refer to an assignment management unit performing operations to implement the data association interface and to assign data elements. However, embodiments are not limited to the assignment management unit performing operations to assign data elements. The operations to assign data elements may be performed by one or more units embodied in the system memory. In other instances, well-known instruction instances, protocols, structures and techniques have not been shown in detail in order not to obfuscate the description.

Some embodiments present sets of data elements in a user interface and allow users to designate associations between the data elements in the sets. For example, one set of data elements may represent file access privileges, whereas another set may represent system files. Some embodiments allow users to associate file access privileges with system files, thereby configuring a file access policy in a data management system. As will be described in greater detail below, embodiments graphically present the data elements in user interfaces, and provide interface mechanisms that enable users to efficiently designate associations between data elements. Although some embodiments can assist users in promulgating file access privileges, the embodiments can be used for associating any suitable data elements.

In some embodiments, user interfaces allow users to designate associations between more than two sets of data elements. Furthermore, embodiments allow users to designate different types of associations (e.g., one-to-one, one-to-many, many-to-one, many-to-many, etc.) between the data elements. These and other embodiments are described in more detail below.

FIG. 1 depicts an example diagram of graphical elements used by a data association interface. As shown, the data association interface includes two columns constituting data elements and a floating data assignment column. In FIG. 1, the graphical components include a personnel column 102, an assignment column 130 and a roles column 160. The personnel column 102 includes names 106-128 (e.g., names stored in an associated database). The roles column 160 includes roles 164-176 from the database. The assignment column 130 is a mechanism for allowing a user to associate data elements in the personnel column 102 with the data elements in the roles column 160 and vice-versa. As shown, the assignment column 130 includes check-boxes 132-154. A user can select one or more of the check-boxes (e.g., via mouse-click) to designate an association between the personnel column 102 and the roles column 160. In some embodiments, the assignment column 130 may not appear until the user makes a selection (see FIGS. 2 and 3). In other embodiments, the personnel column 102 and the roles column 160 may have separate assignment columns which are disabled (e.g., entries are not allowed in check-boxes of the assignment columns) until the user makes a selection in one of the personnel column 102 or the roles column 160. For example, when the user makes a selection in the personnel column 102 (or the roles column 160), the respective assignment column of the roles column 160 (or the personnel column 102) is enabled. The discussion of FIGS. 2-5 describes how these components enable users to associate data elements in a database. Although not shown in FIG. 1, in some embodiments, operations of the data association interface are controlled by an association management unit residing in a computer system (see FIG. 11).

FIG. 2 depicts an example diagram of a data association interface that facilitates a one-to-many assignment between data elements residing in two columns. FIG. 2 includes a data association interface 200 including a personnel column 202, a roles column 260 and an assignment column 230. Initially the columns 202, 260, and 230 appear separately (e.g., similar to FIG. 1). After some user input, two of the columns will "snap together" and appear in a juxtaposed position, as shown in FIG. 2. The personnel column 202 includes data elements 206-228, where each data element includes a name, such as "Matt" in data element 210. The roles column includes data elements 264-276, where each data element includes a role, such as "Super User" in data element 264. The assignment column 230 includes check-boxes 232-244. In FIG. 2, a user has selected (e.g., via mouse click) the data element 210 (i.e., Matt) in the personnel column 202. In FIG. 2, the user selection is indicated by a heavy border around the data element 210. The user can associate the selected data element 210 in the personnel column 202 with a number of data elements in the roles column 260. Thus, the data association interface 200 enables a user to designate one-to-many relationships between a single data element in the personnel column 202 and multiple data elements in the roles column 260.

After a user selects the data element 210, an assignment management unit (a component not shown in FIG. 2) presents the assignment column 230 juxtaposed to the roles column 260 (see FIG. 2). Because the assignment column 230 is juxtaposed to the roles column 260, a user can efficiently select one or more roles to associate with the data element 210 (i.e., Matt). In FIG. 2, user selections are shown as checks in the check-boxes 232, 234, 238, & 240 of the assignment column 230. In FIG. 2, the user has selected the following roles for Matt: Super User 264, Application Administrator 266, Role One 270, and Role Two 272. After the user selects roles, the assignment management unit associates the selected roles with the data element 210 (i.e., Matt). Therefore, the data association interface 200 has facilitated a one-to-many data association between the personnel data element 210 (Matt) and the following roles: Super User 264, Application Administrator 266, Role One 270, and Role Two 272. After these user interface operations, the data management system can persistently store these data associations.

Although the data elements in FIG. 2 relate to personnel and roles, the data association interface and its mechanism for facilitating data element selection can be applied to any suitable data elements.

Figure 3:
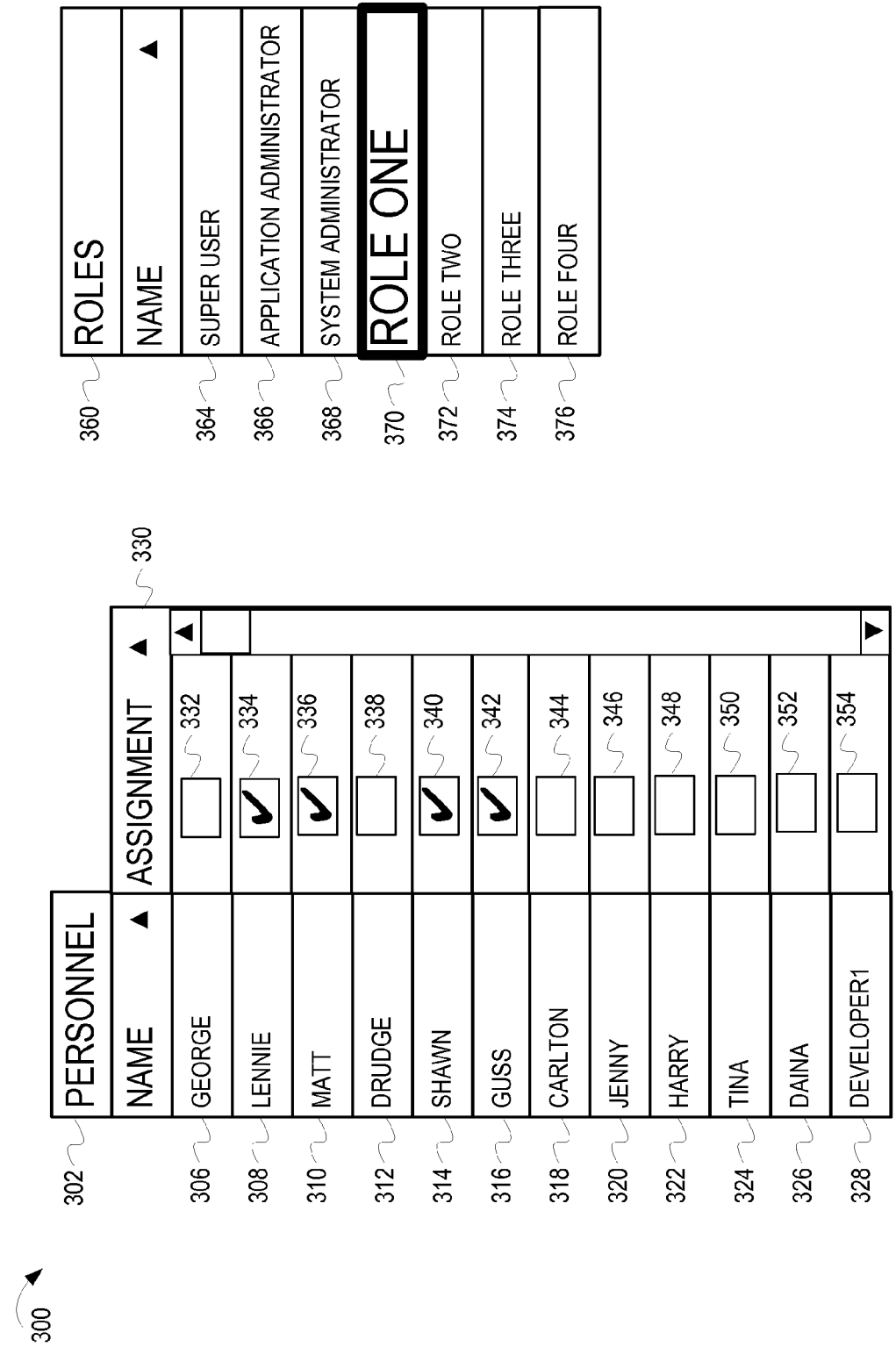
FIG. 3 depicts an example diagram of a data association interface that facilitates a many-to-one assignment between data elements residing in two columns.

FIG. 3 depicts an example diagram of a data association interface that facilitates a many-to-one assignment between data elements residing in two columns. FIG. 3 includes a data association interface 300 including a personnel column 302, a roles column 360, and an assignment column 330. Initially, the columns 302, 360, and 330 appear independently (similar to FIG. 1). After certain user input, two of the columns will "snap together" and appear in a juxtaposed position, as shown in FIG. 3. The personnel column 302 includes data elements 306-328, where each data element includes a name, such as "Matt" in data element 310. The roles column includes data elements 364-376, where each data element includes a role, such as "Role One" in the data element 370. The assignment column 330 includes check-boxes 332-354. In FIG. 3, a user has selected (e.g., via mouse click) the data element 370 (i.e., Role One) in the roles column 360. In FIG. 3, the user selection is indicated by a heavy border around the data element 370. The user can associate the selected data element 370 in the roles column 360 with a number of data elements in the personnel column 302. Thus, the data association interface 300 enables a user to designate many-to-one relationships between multiple data elements in the personnel column 302 with a single data element in the roles column 360.

After a user selects the data element 370, an assignment management unit (a component not shown in FIG. 3) presents the assignment column 330 juxtaposed to the personnel column 302. Because the assignment column 330 is juxtaposed to the personnel column 302, a user can efficiently select one or more personnel to associate with the data element 370 (i.e., Role One). In FIG. 3, user selections are shown as checks in the check-boxes 334, 336, 340 & 342 of the assignment column 330. In FIG. 3, the user has selected the following personnel data elements for Role One: Lennie 308, Matt 310, Shawn 314, and Guss 316. After the user selects personnel data elements, the assignment management unit can associate the selected personnel with the data element 370 (i.e., Role One). Therefore, the data association interface 300 facilitates a many-to-one data association between the following personnel: Lennie 308, Matt 310, Shawn 314, and Guss 316 and the roles data element Role One (370). After these user interface operations, the data management system can persistently store these data associations.

Figure 4:
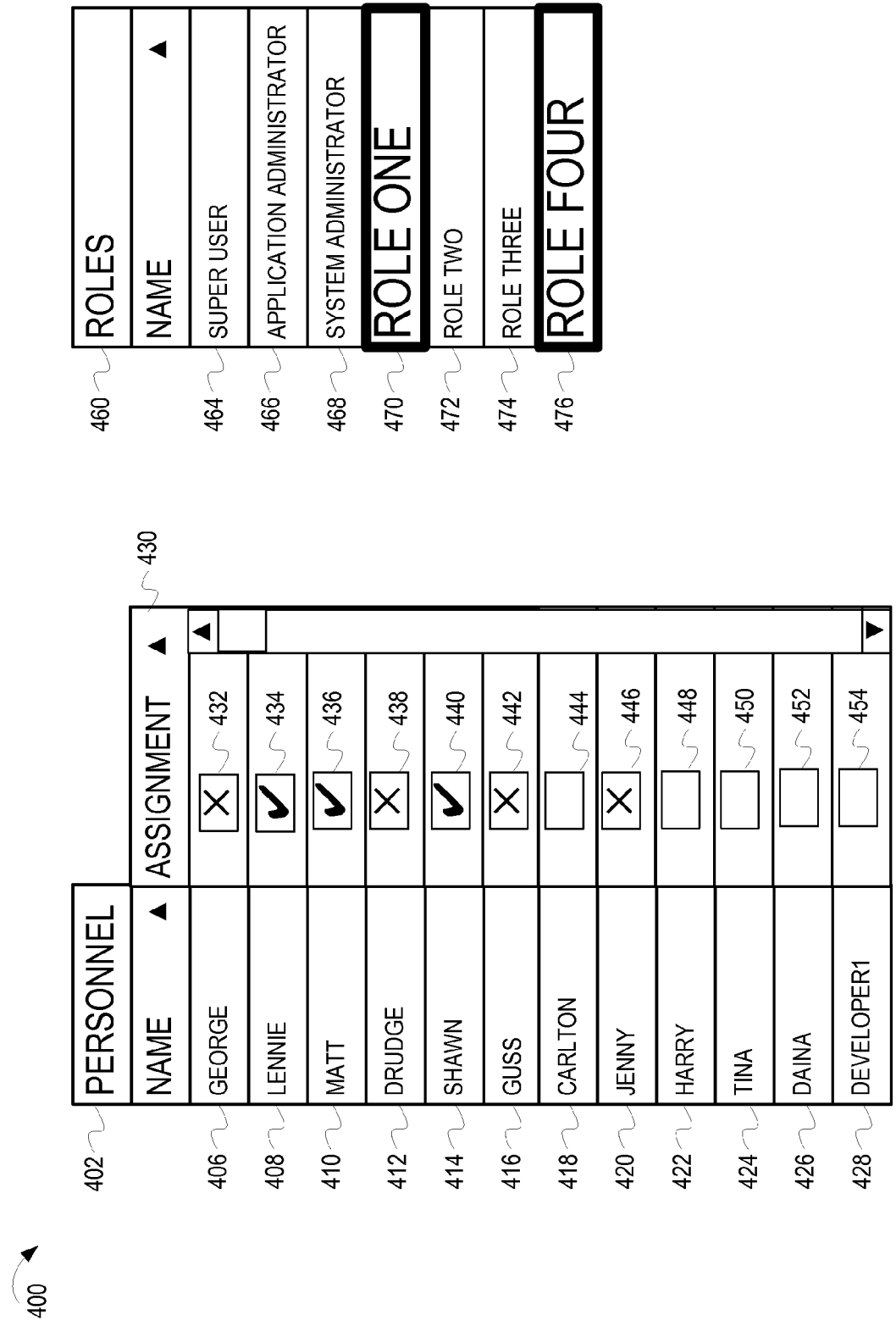
FIG. 4 depicts an example diagram of a data association interface that facilitates many-to-many assignments between data elements residing in two columns.

FIG. 4 depicts an example diagram of a data association interface that facilitates many-to-many assignments between data elements residing in two columns. FIG. 4 includes a data association interface 400 including a personnel column 402, a roles column 460 and an assignment column 430. Initially the columns 402, 460, and 430 appear separately (e.g., similar to FIG. 1). After certain user input, two of the columns will "snap together" and appear in a juxtaposed position as shown FIG. 4. The personnel column 402 includes data elements 406-428, where each data element includes a name, such as "Matt" in data element 410. The roles column includes data elements 464-476, where each data element includes a role, such as "Role One" in the data element 470. The assignment column 430 includes check-boxes 432-454. In FIG. 4, a user has selected (e.g., via mouse click) the data element 470 (i.e., Role One) and the data element 476 (i.e., Role Four) in the roles column 460. In FIG. 4, the user selection is indicated by a heavy border around the data element 470 and the data element 476.

After a user selects the data elements 470 and 476, an assignment management unit (not shown in FIG. 4) presents the assignment column 430 juxtaposed to the personnel column 402. Because the assignment column 430 is juxtaposed to the personnel column 402, a user can efficiently select one or more personnel to associate with the data element 470 (i.e., Role One) and the data element 476 (i.e., Role Four). When the data elements 470 and 476 are selected in the roles column 460, the assignment column 430 can display more than one type of selection in check-boxes of the assignment column 430. For example, the assignment column 430 may display a check, a cross, etc. in the check-boxes. Different selections in the check-boxes indicate whether the data elements in the personnel column 402 are assigned to all the selected elements (i.e., data elements 470 and 476) in the roles column 460, or the data elements in the personnel column 402 are assigned to some (but not all) of the selected elements in the roles column 460. For example, a cross in the check-boxes 432, 438, 442 and 446 indicates that the data elements 406, 412, 416 and 420 are associated (e.g., by a previous user selection) with either the data element 470 (Role One) or the data element 476 (Role Four). Once the user has selected data elements 470 and 476, the user can select one or more personnel to associate with the data elements 470 (Role One) and 476 (Role Four). In FIG. 4, user selections are shown as checks in the check-boxes 434, 436 and 440. The checks indicate that the user has selected data elements Lennie 408, Matt 410 and Shawn 414 in the personnel column 402 for assignment to each of the data elements 470 and 476 in the roles column 460. The user may also change the selection (i.e., cross to check) in one or more of the check-boxes 432, 438, 442 and 446 to assign the data elements George 406, Drudge 412, Guss 416 and Jenny 420 to each of the data elements 470 and 476. In some embodiments, the assignment management unit can utilize other marks (e.g., a circle, a triangle, etc.) or numbers (e.g., 1, 2, 3, etc.) to distinguish assignments to certain selected data elements in the roles column 460. In FIG. 4, the user has selected the following personnel data elements for both roles (i.e., many-to-many assignment) Role One and Role Four: Lennie 408, Matt 410, and Shawn 414 (selected using a check). After the user selects personnel data elements, an assignment management unit can associate the personnel selected using checks with the data elements 470 (i.e., Role One) and 476 (i.e., Role Four). Therefore, the data association interface 400 has facilitated a many-to-many data association between the following personnel: Lennie 408, Matt 410, and Shawn 414 with the roles data elements Role One (470) and Role Four (476). After these user interface operations, the data management system can persistently store these data associations.

Figure 5:
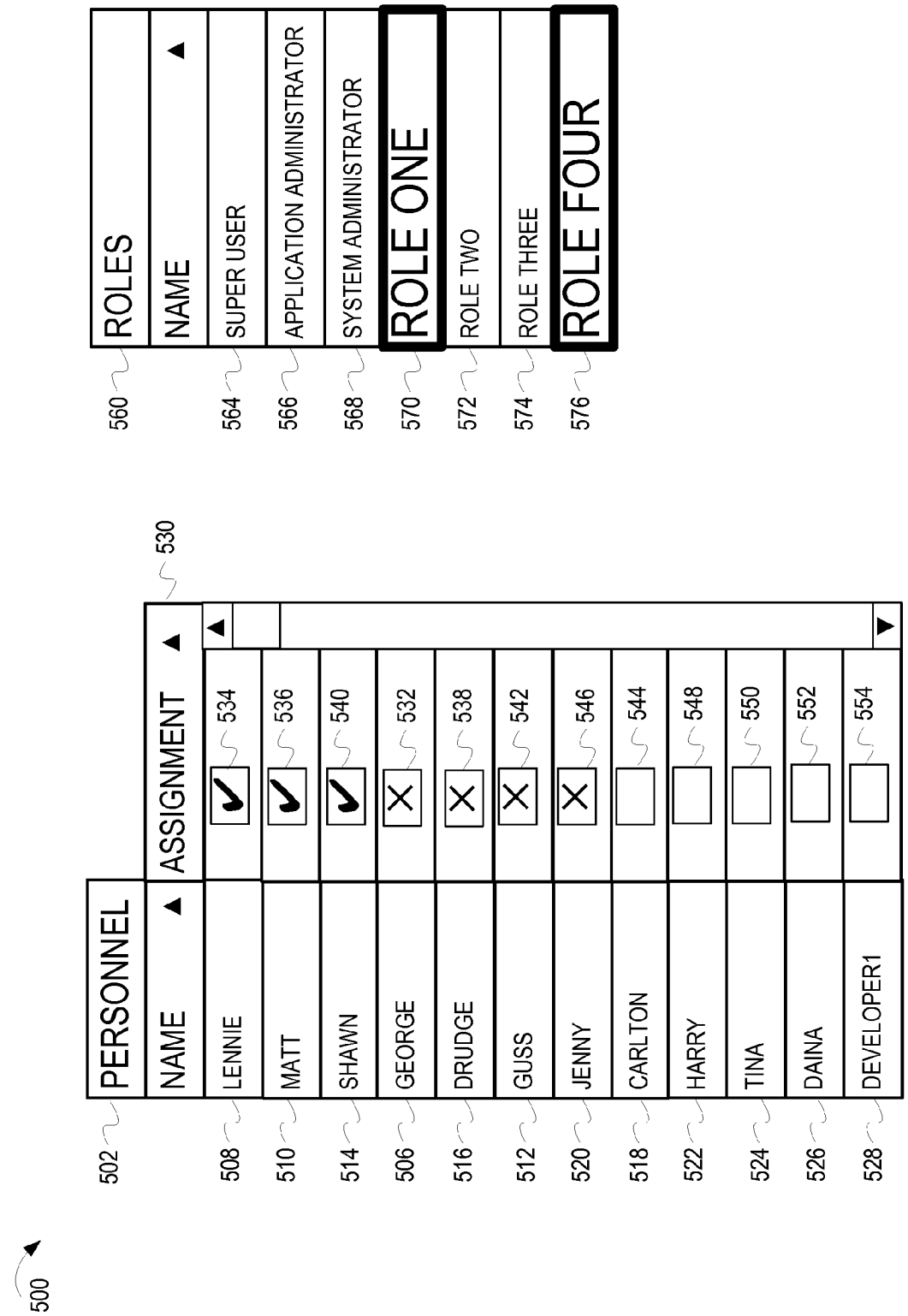
FIG. 5 depicts an example diagram of a data association interface that facilitates sorting data elements based on data assignments between data elements residing in two columns.

FIG. 5 depicts an example diagram of a data association interface that facilitates sorting data elements based on data assignments between data elements residing in two columns. FIG. 5 includes a data association interface 500 including a personnel column 502, a roles column 560 and an assignment column 530. The personnel column 502 includes data elements 506-528, where each data element includes a name, such as "Matt" in data element 510. The roles column includes data elements 564-576, where each data element includes a role, such as "Role One" in the data element 570. The assignment column 530 includes check-boxes 532-554. In FIG. 5, the following personnel: George 506, Drudge 516, Guss 512 and Jenny 520 are assigned to one of Role One (570) or Role Four (576) as shown by crosses in the check-boxes 532, 538, 542 and 546. Also, the following personnel: Lennie 508, Matt 510, and Shawn 514 are assigned to both Role One (570) and Role Four (576) as shown by checks in the check-boxes 534, 536 and 540. When a user clicks on the assignment column 530, an assignment management unit (not depicted in FIG. 5), sorts the data elements in the personnel column 502 corresponding to check marks on top (i.e., personnel: Lennie 508, Matt 510, and Shawn 514), followed by data elements corresponding to cross marks (i.e., personnel: George 506, Drudge 516, Guss 512 and Jenny 520). In some embodiments, the assignment management unit may sort the data elements corresponding to cross marks on the top, followed by data elements corresponding to check marks in the personnel column 502.

FIG. 6 depicts an example diagram of graphical elements used by a data association interface for association between data elements residing in three columns. As shown, the data association interface includes three columns constituting data elements and two floating data assignment columns. In FIG. 6, the graphical components include a personnel column 602, an assignment column 630, a roles column 660, an assignment column 601, and a groups column 680. The personnel column 602 includes names 606-628 (e.g., names stored in an associated database). The roles column 660 includes roles 664-676 from the database. The groups column 680 includes groups 684-692 from the database. The assignment column 630 is a mechanism for allowing a user to associate data elements in the personnel column 602 with the data elements in the roles column 660 and vice-versa. The assignment column 601 is a mechanism for allowing a user to associate data elements in the roles column 660 with the data elements in the groups column 680 and vice-versa. As shown, the assignment column 630 includes check-boxes 632-654 and the assignment column 601 includes check-boxes 603-625. A user can select one or more of the check-boxes (e.g., via mouse-click) in the assignment column 630 to designate an association between the personnel column 602 and the roles column 660. Similarly a user can select one or more of the check-boxes in the assignment column 601 to designate an association between the roles column 660 and the groups column 680. In some embodiments, the assignment columns 630 and 601 may not appear until the user makes a selection (see FIGS. 7, 8 and 9). In other embodiments, the personnel column 602, the roles column 660, and the groups column 680 may have separate assignment columns which are disabled (e.g., entries are not allowed in check-boxes of the assignment columns) until the user makes a selection in one of the personnel column 602, the roles column 660, or the groups column 680. The discussion of FIGS. 7-9 describes how these components enable users to associate data elements in a database. Although not shown in FIG. 6, in some embodiments, operations of the data association interface are controlled by an association management unit residing in a computer system (see FIG. 11).

Figure 7:
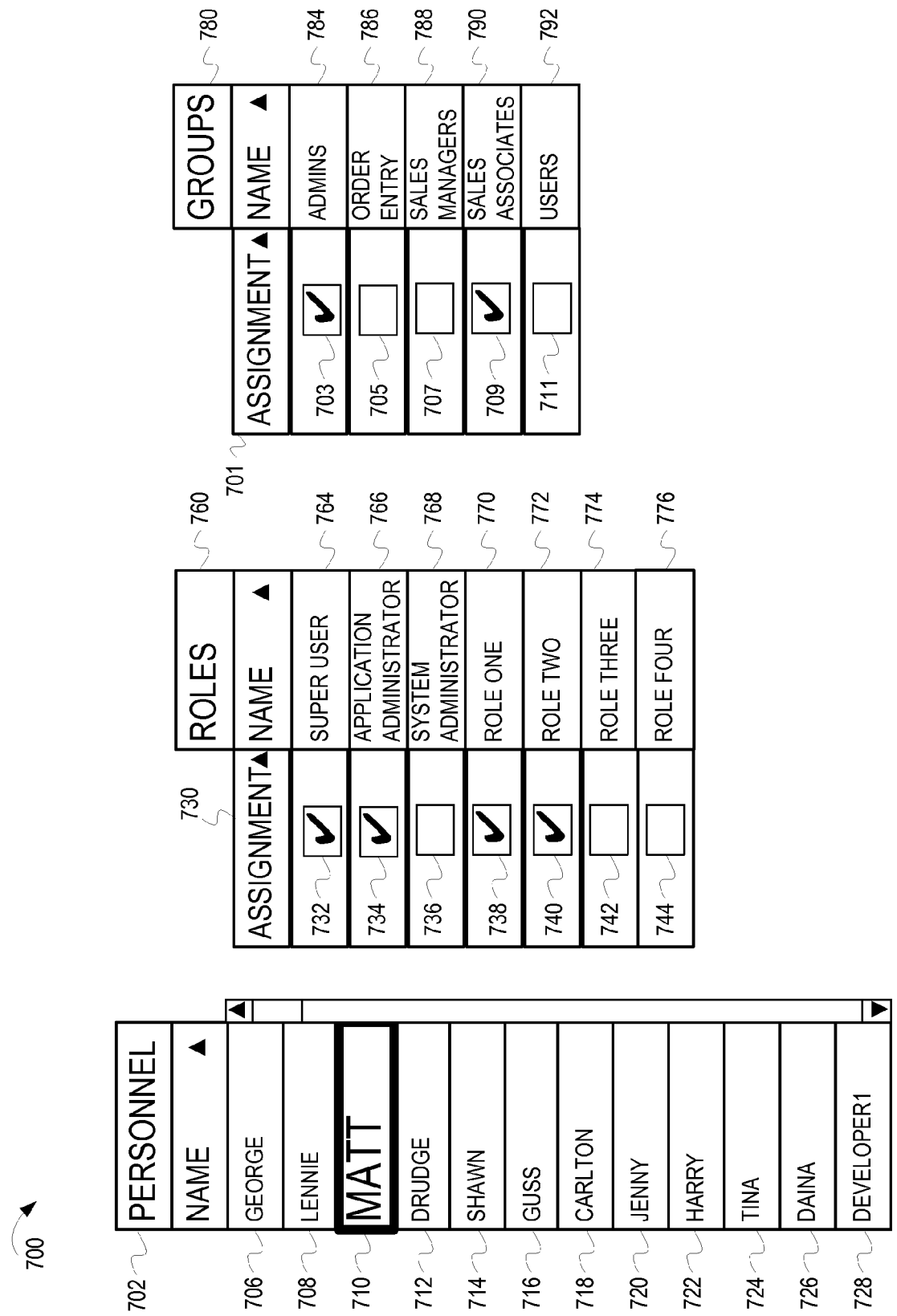
FIG. 7 depicts an example diagram of a data association interface that facilitates multiple one-to-many assignments between data elements residing in three columns.

FIG. 7 depicts an example diagram of a data association interface that facilitates multiple one-to-many assignments between data elements residing in three columns. FIG. 7 includes a data association interface 700 including a personnel column 702, a roles column 760, a groups column 780, an assignment column 730, and an assignment column 701. Initially the columns 702, 760, 780, 730 and 701 appear separately (e.g., similar to FIG. 6). After certain user input, two of the three columns 702, 760 and 780 "snap together" with the assignment column 730 and the assignment column 701, and appear in a juxtaposed position as shown FIG. 7. The personnel column 702 includes data elements 706-728, where each data element includes a name, such as "Matt" in data element 710. The roles column 760 includes data elements 764-776, where each data element includes a role, such as "Super User" in data element 764. The assignment column 730 includes check-boxes 732-744. The groups column 780 includes data elements 784-792, where each data element includes a group, such as "Admins" in data element 784. The assignment column 701 includes check-boxes 703-711. In FIG. 7, a user has selected (e.g., via mouse click) the data element 710 (i.e., Matt) in the personnel column 702. In FIG. 7, the user selection is indicated by a heavy border around the data element 710. The user can associate the selected data element 710 in the personnel column 702 with a number of data elements in the roles column 760 and the groups column 780. Thus, the data association interface 700 enables a user to designate multiple one-to-many relationships between a single data element in the personnel column 702 and multiple data elements in the roles column 760, as well as multiple data elements in the groups column 780.

After a user selects the data element 710, an assignment management unit (a component not shown in FIG. 7) presents the assignment column 730 juxtaposed to the roles column 760 (see FIG. 7). Also, the assignment management unit presents the assignment column 701 juxtaposed to the groups column 780. Because the assignment column 730 is juxtaposed to the roles column 760, and the assignment column 701 is juxtaposed to the groups column 780, a user can efficiently select one or more roles as well as one or more groups to associate with the data element 710 (i.e., Matt). In FIG. 7, user selections in the assignment column 730 are shown as checks in the check-boxes 732, 734, 738, & 740. Similarly, user selections in the assignment column 701 are shown as checks in the check-boxes 703 & 709. In FIG. 7, the user has selected the following roles for Matt: Super User 764, Application Administrator 766, Role One 770, and Role Two 772. The user has also selected the following groups for Matt: Admins 784, and Sales Associates 790. After the user selects roles and groups, the assignment management unit associates the selected roles and groups with the data element 710 (i.e., Matt). Therefore, the data association interface 700 has facilitated multiple one-to-many data associations, a first one-to-many data association between the personnel data element 110 (Matt) and the following roles: Super User 764, Application Administrator 766, Role One 770, and Role Two 772; and a second one-to-many data association between the personnel data element 110 (Matt) and the following groups: Admins 784, and Sales Associates 790. After these user interface operations, the data management system can persistently store these data associations.

Although the data elements in FIG. 7 relate to personnel, roles and groups, the data association interface and its mechanism for facilitating data element selection can be applied to any suitable data elements.

Figure 8:
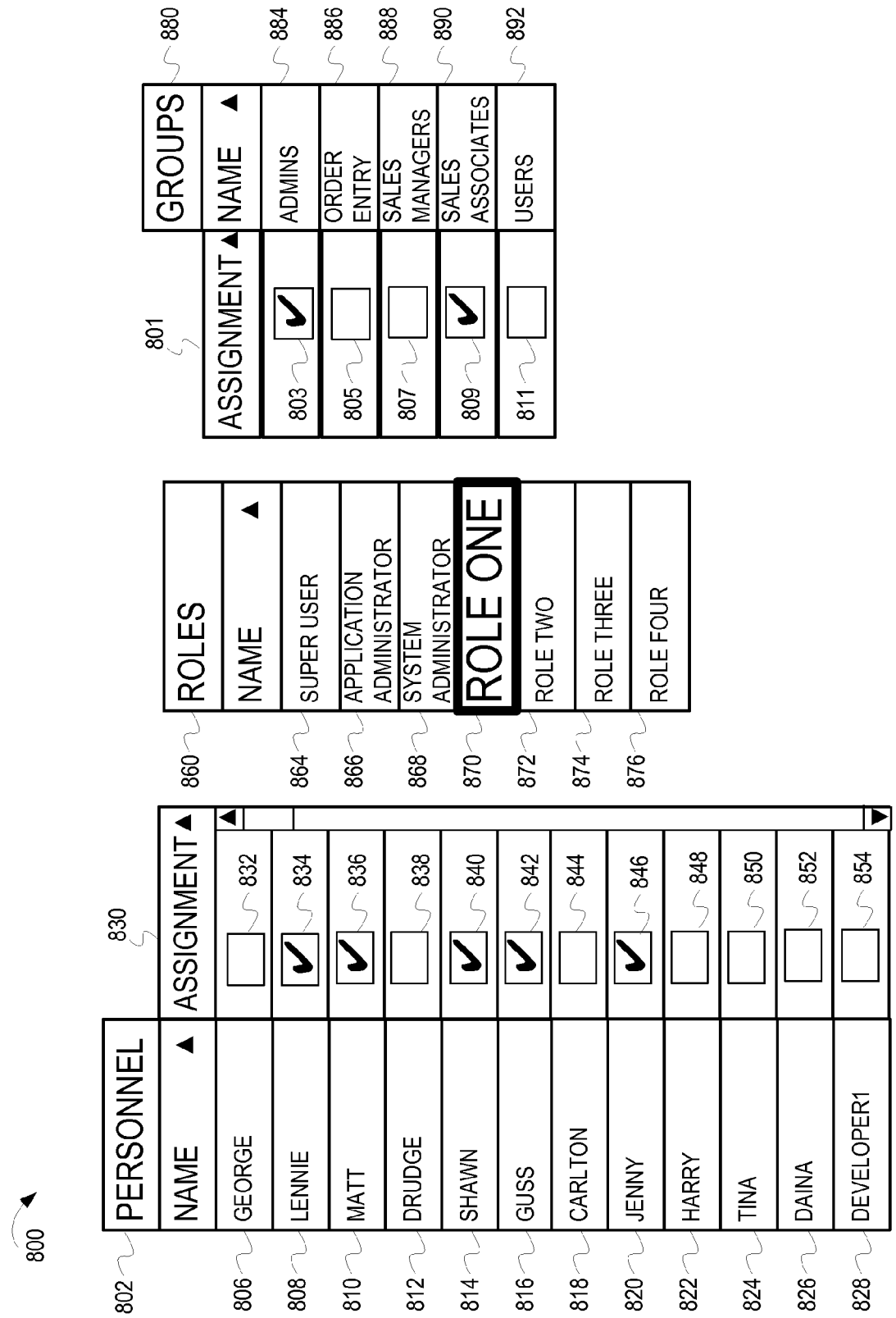
FIG. 8 depicts an example diagram of a data association interface that facilitates a many-to-one assignment and a one-to-many assignment between data elements in three columns.

FIG. 8 depicts an example diagram of a data association interface that facilitates a many-to-one assignment and a one-to-many assignment between data elements in three columns. FIG. 8 includes a data association interface 800 including a personnel column 802, a roles column 860, a groups column 880, an assignment column 830, and an assignment column 801. Initially the columns 802, 860, 880, 830 and 801 appear separately (e.g., similar to FIG. 6). After certain user input, two of the three columns 802, 860 and 880 "snap together" with the assignment column 830 and the assignment column 801, respectively and appear in a juxtaposed position as shown FIG. 8. The personnel column 802 includes data elements 806-828, where each data element includes a name, such as "Lennie" in data element 808. The assignment column 830 includes check-boxes 832-854. The roles column 860 includes data elements 864-876, where each data element includes a role, such as "Role One" in data element 870. The groups column 880 includes data elements 884-892, where each data element includes a group, such as "Admins" in data element 884. The assignment column 801 includes check-boxes 803-811. In FIG. 8, a user has selected (e.g., via mouse click) the data element 870 (i.e., Role One) in the roles column 860. In FIG. 8, the user selection is indicated by a heavy border around the data element 870. The user can associate the selected data element 870 in the roles column 860 with a number of data elements in the personnel column 802 and the groups column 880. Thus, the data association interface 800 enables a user to designate a many-to-one relationship between multiple data elements in the personnel column 802 and a single data element in the roles column 860. The data association interface 800 also enables the user to designate a one-to-many relationship between a single data element in the roles column 860 and multiple data elements in the groups column 880.

After a user selects the data element 870, an assignment management unit (a component not shown in FIG. 8) presents the assignment column 830 juxtaposed to the personnel column 802 (see FIG. 8). Also, the assignment management unit presents the assignment column 801 juxtaposed to the groups column 880. Because the assignment column 830 is juxtaposed to the roles column 860, and the assignment column 801 is juxtaposed to the groups column 880, a user can efficiently select one or more personnel as well as one or more groups to associate with the data element 870 (i.e., Role One). In FIG. 8, user selections in the assignment column 830 are shown as checks in the check-boxes 834, 836, 840, 842 & 846. Similarly, user selections in the assignment column 801 are shown as checks in the check-boxes 803 & 809. In FIG. 8, the user has selected the following personnel for Role One: Lennie 808, Matt 810, Shawn 814, Guss 816, and Jenny 820. The user has also selected the following groups for Role One: Admins 884, and Sales Associates 890. After the user selects personnel and groups, the assignment management unit associates the selected personnel and groups with the data element 870 (i.e., Role One). Therefore, the data association interface 800 has facilitated a many-to-one data association between the following personnel: Lennie 808, Matt 810, Shawn 814, Guss 816 & Jenny 820 and the roles data element 870 (Role One). The data association interface 800 has facilitated a one-to-many data association between the roles data element 870 (Role One) and the following groups: Admins 884, and Sales Associates 890. After these user interface operations, the data management system can persistently store these data associations.

Figure 9:
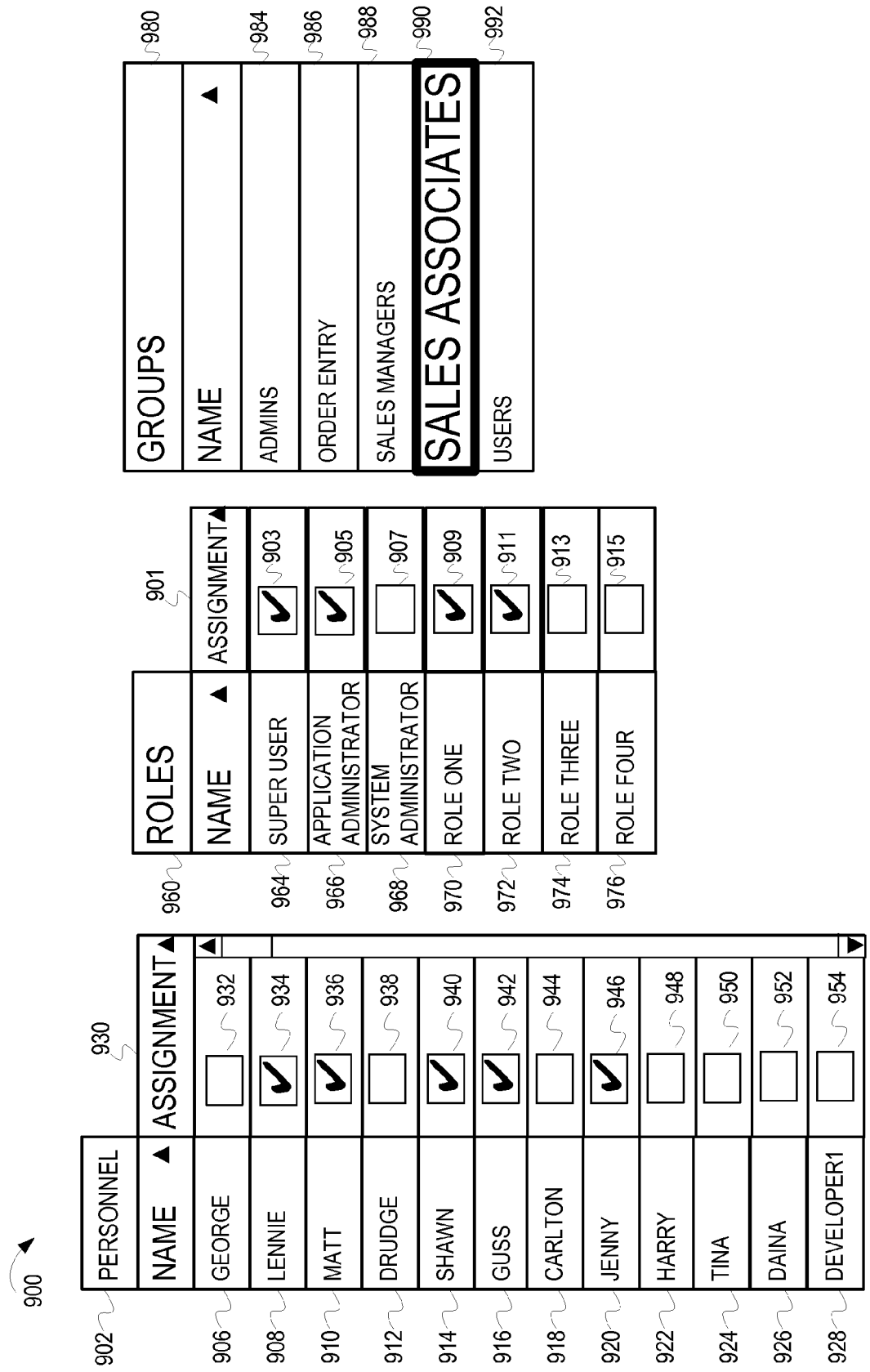
FIG. 9 depicts an example diagram of a data association interface that facilitates multiple many-to-one assignments between data elements in three columns.

FIG. 9 depicts an example diagram of a data association interface that facilitates multiple many-to-one assignments between data elements in three columns. FIG. 9 includes a data association interface 900 including a personnel column 902, a roles column 960, a groups column 980, an assignment column 930, and an assignment column 901. Initially the columns 902, 960, 980, 930 and 901 appear separately (e.g., similar to FIG. 6). After certain user input, two of the three columns 902, 960 and 980 "snap together" with the assignment column 930 and the assignment column 901, respectively and appear in a juxtaposed position as shown FIG. 9. The personnel column 902 includes data elements 906-928, where each data element includes a name, such as "Lennie" in data element 908. The roles column 960 includes data elements 964-976, where each data element includes a role, such as "Super User" in data element 964. The assignment column 930 includes check-boxes 932-954. The groups column 980 includes data elements 984-992, where each data element includes a group, such as Sales Associates" in data element 984. The assignment column 901 includes check-boxes 903-915. In FIG. 9, a user has selected (e.g., via mouse click) the data element 990 (i.e., Sales Associates) in the groups column 980. In FIG. 9, the user selection is indicated by a heavy border around the data element 990. The user can associate the selected data element 990 in the groups column 980 with a number of data elements in the personnel column 902 and the roles column 960. Thus, the data association interface 900 enables a user to designate multiple many-to-one relationships, a first many-to-one relationship between multiple data elements in the personnel column 902 and a single data element in the groups column 980; and a second many-to-one relationship between multiple data elements in the roles column 960 and a single data element in the groups column 980.

After a user selects the data element 990, an assignment management unit (a component not shown in FIG. 9) presents the assignment column 930 juxtaposed to the personnel column 902 (see FIG. 9). Also, the assignment management unit presents the assignment column 901 juxtaposed to the roles column 960. Because the assignment column 930 is juxtaposed to the personnel column 902, and the assignment column 901 is juxtaposed to the roles column 960, a user can efficiently select one or more personnel as well as one or more roles to associate with the data element 990 (i.e., Sales Associates). In FIG. 9, user selections in the assignment column 930 are shown as checks in the check-boxes 934, 936, 940, 942 & 946. Similarly, user selections in the assignment column 901 are shown as checks in the check-boxes 903, 905, 909 & 911. In FIG. 9, the user has selected the following personnel for Sales Associates: Lennie 908, Matt 910, Shawn 914, Guss 916, and Jenny 920. The user has also selected the following roles for Super Associates Super User 964, Application Administrator 966, Role One 970 and Role Two 972. After the user selects personnel and roles, the assignment management unit associates the selected personnel and roles with the data element 990 (i.e., Sales Associates). Therefore, the data association interface 900 has facilitated multiple many-to-one data associations, a first many-to-one data association between the following personnel data elements: Lennie 908, Matt 910, Shawn 914, Guss 916, and Jenny 920 and the groups data element 990 (Sales Associates); and a second many-to-one data association between the following roles data elements: Super User 964, Application Administrator 966, Role One 970 and Role Two 972 and the groups data element 990 (Sales Associates). After these user interface operations, the data management system can persistently store these data associations.

Figure 10:
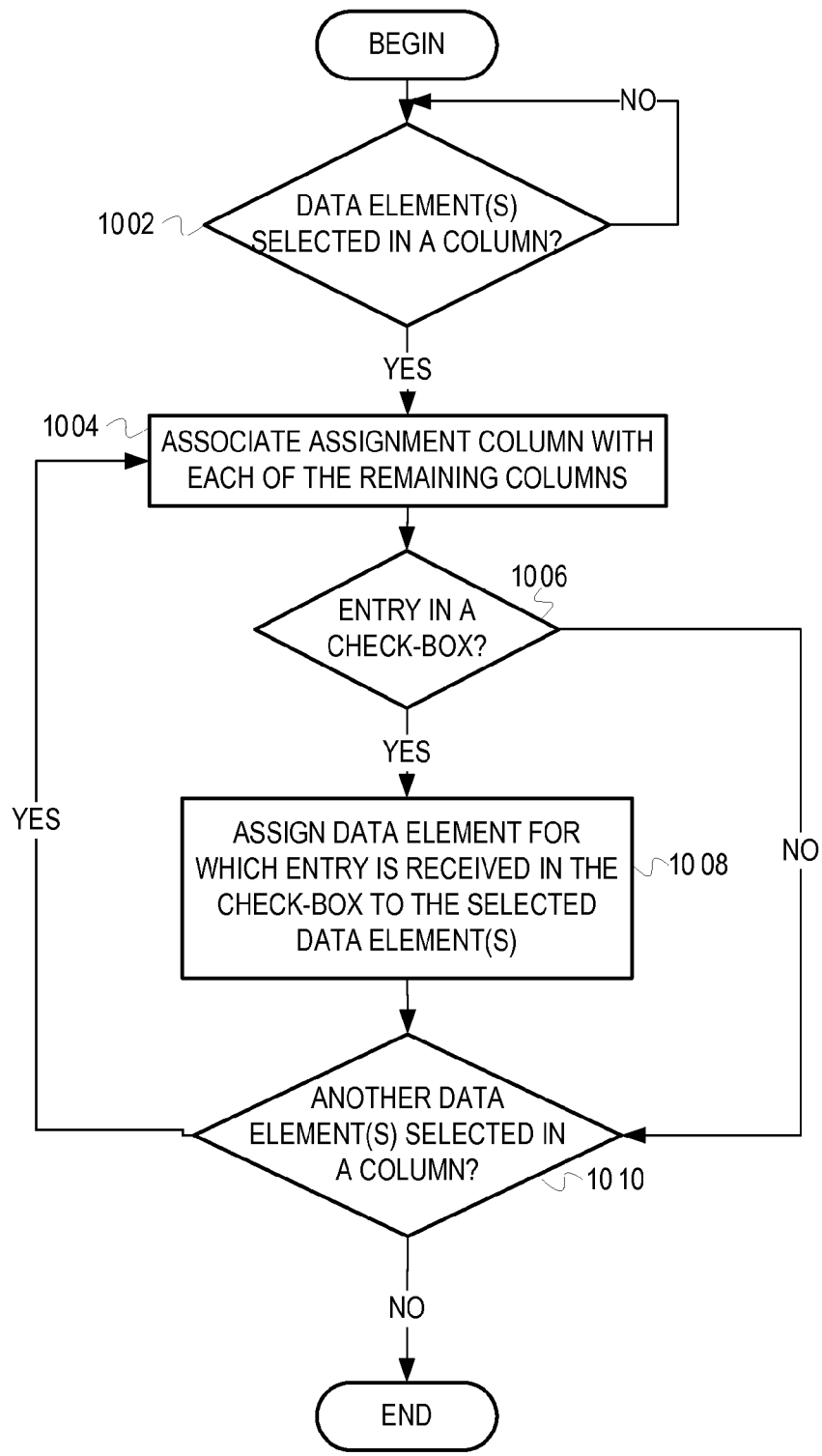
FIG. 10 illustrates a flow diagram of example operations to assign data elements.

FIG. 10 illustrates a flow diagram of example operations to assign data elements in a data association interface.

At block 1002, an assignment management unit determines whether a data element(s) is selected in a column in the data association interface. If a data element(s) is selected in a column, control flows to block 1004. If a data element(s) is not selected in a column, the control loops back to block 1002. In some embodiments, the assignment management unit waits for a certain period before looping back to block 1002.

At block 1004, the assignment management unit associates an assignment column with each of the remaining columns in the data association interface. The assignment management unit associates assignment columns to establish assignments between data elements of the remaining columns with the data element(s) selected at block 1002.

At block 1006, the assignment management unit determines whether an entry is received in a check-box of an assignment column. If an entry is received in the check-box of the assignment column, control flows to block 1008. If an entry is not received in the check-box of the assignment column, control flows to block 1010. In some embodiments, when an entry is made in the check-box, the assignment management unit waits to receive more entries in other check-boxes.

At block 1008, the assignment management unit assigns the data element for which entry is received in the corresponding check-box to the selected data element(s). In some embodiments, when entries are received in multiple check-boxes, the assignment management unit assigns the corresponding multiple data elements to the selected data element(s).

At block 1010, the assignment management unit determines whether another data element(s) is selected in a column in the data association interface. If another data element(s) is selected in a column, control flows to block 1004. If another data element(s) is not selected in a column, the assignment management unit completes operations. In some embodiments, the control may loop back to the block 1006 when another data element(s) is not selected in a column. If an entry is not received in a check-box at block 1006 within a certain time, the assignment management unit completes operations.

The data association interface in FIGS. 6-9 is not limited to three columns constituting data elements. The data association interface in FIGS. 6-9 can handle more number of columns as long as the columns can be accommodated on the display area of a screen. The data association interface allows assignments between data elements of the columns irrespective of the position of the columns (i.e., a data element in a first column may be assigned to a data element in a second column, when the two columns are not adjacent to each other). The data association interface allows assignments between data elements in both directions (i.e., left to right and right to left). However, the assignment management unit can be configured to restrict assignments in both directions. The assignment management unit can also be configured to restrict assignment between data elements of columns which are not adjacent to each other. The assignment management unit can restrict assignments by selectively disabling certain assignment columns.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
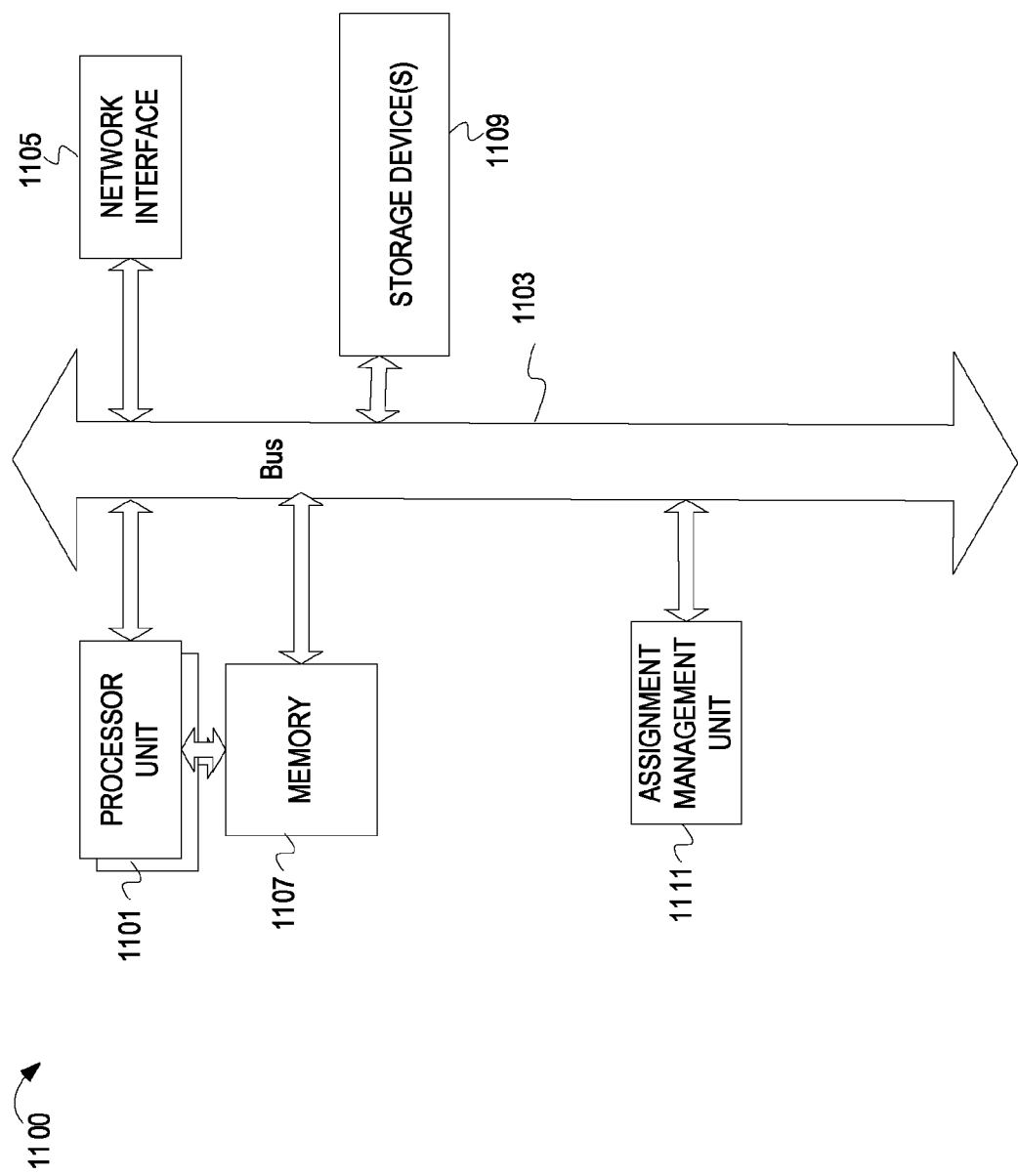
FIG. 11 depicts an example computer system.

FIG. 11 depicts an example computer system 1100. The computer system 1100 includes a processor unit 1101 (possibly including multiple processors, multiple cores, multiple nodes, and/or implementing multi-threading, etc.). The computer system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1103 (e.g., PCI, ISA, PCI-Express, HyperTransport®, InfiniBand®, NuBus, etc.), a network interface 1105 (e.g., an ATM interface, an Ethernet interface, a Frame Relay interface, SONET interface, wireless interface, etc.), a storage device(s) 1109 (e.g., optical storage, magnetic storage, etc.), and an assignment management unit 1111. The assignment management unit 1111 embodies functionality to implement embodiments described above. The assignment management unit 1111 may include one or more functionalities that facilitate assignment of data elements in a data association interface. Although depicted as being coupled to the bus 1103, the assignment management unit 1111 may be embodied in the memory 1107. Any one of these functionalities may be partially (or entirely) implemented in hardware and/or on the processing unit 1101. For example, the functionality may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1109, and the network interface 1105 are coupled to the bus 1103. Although illustrated as being coupled to the bus 1103, the memory 1107 may be coupled to the processor unit 1101.

While the embodiments are described with reference to various implementations and exploitations, it will be understood that these embodiments are illustrative and that the scope of the inventive subject matter is not limited to them. In general, techniques for assigning elements in a data association interface as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for using a graphical user interface to associate data in a database, the method comprising:
    presenting a data assignment column, a first data element column, and a second data element column in the graphical user interface, wherein the first and second data element columns show data elements stored in a database;
    receiving first user input selecting one or more data elements in the first data element column;
    after receiving the first user input, configuring data assignment elements of the data assignment column to correspond to the data elements of the second data element column;
    moving the data assignment column in juxtaposition to the second data element column, wherein the data assignment column's data assignment elements visually correspond to the second data element column's data elements;
    receiving second user input in one or more of the data assignment elements indicating selection of one or more data elements of the second data element column; and
    associating, in the database, the selected one or more data elements in the first data element column with the selected one or more data elements in the second data element column;
    wherein the data assignment column comprises a selection interface for designating at least one of a many-to-one relationship, a one-to-many relationship, or a many-to-many relationship between the one or more selected data elements in the first data element column and the one or more selected data elements in the second data element column.

2. The method of claim 1, wherein the first and second user inputs include activation of check-boxes.

3. The method of claim 1, wherein the data elements correspond to at least one or roles and personnel in an employment database.

4. The method of claim 1, wherein the data assignment column is configured to be dynamically sized according to the number of data elements in the second data element column.

5. The method of claim 1 further comprising:
    presenting a second data assignment column and a third data column;
    after receiving the first user input, configuring data assignment elements of the second data assignment column to correspond to data elements of the third data column;
    moving the second assignment column in juxtaposition to the third data column, wherein the second data assignment column's data assignment elements visually correspond to the third data column's data elements;
    receiving third user input in one or more of the second data assignment column's data assignment elements indicating selection of one or more data elements of the third data column; and
    associating, in the database, the selected one or more data elements in the first data element column with the selected one or more data elements in the third data column.

6. The method of claim 5, wherein the first data element column, the second data element column, and the data assignment column can be dragged and dropped in the graphical user interface based on the third user input.

7. The method of claim 5, wherein said moving the second data assignment column in juxtaposition to the third data column includes horizontally aligning assignment elements in the second data assignment column with data elements in the second data element column.

8. The method of claim 1, wherein the database is a relational database.

* * * * *